US012646157B2

(12) United States Patent
Chen

(10) Patent No.: US 12,646,157 B2
(45) Date of Patent: Jun. 2, 2026

(54) METHOD OF PROCESSING MULTIPLE IMAGE SOURCES, RELATED DISPLAY DEVICE AND COMPUTER-READABLE MEDIUM

(71) Applicant: AmTRAN TECHNOLOGY CO., LTD, New Taipei City (TW)

(72) Inventor: Chao-Ching Chen, New Taipei City (TW)

(73) Assignee: AmTRAN TECHNOLOGY CO., LTD, New Taipei City (TW)

( * ) Notice: Subject to any disclaimer, the term of this patent is extended or adjusted under 35 U.S.C. 154(b) by 190 days.

(21) Appl. No.: 18/378,644

(22) Filed: Oct. 10, 2023

(65) Prior Publication Data

US 2024/0331118 A1     Oct. 3, 2024

(30) Foreign Application Priority Data

Mar. 27, 2023    (TW) .................................. 112111476

(51) Int. Cl.
| | |
|---|---|
| *G06T 5/92* | (2024.01) |
| *G06T 5/20* | (2006.01) |
| *G06T 5/70* | (2024.01) |
| *G06T 7/246* | (2017.01) |
| *G09G 5/10* | (2006.01) |

(52) U.S. Cl.
CPC .................. *G06T 5/92* (2024.01); *G06T 5/20* (2013.01); *G06T 5/70* (2024.01); *G06T 7/248* (2017.01); *G09G 5/10* (2013.01); *G06T 2207/20182* (2013.01); *G06T 2207/20208* (2013.01); *G06T 2207/20212* (2013.01); *G09G*
*2320/0247* (2013.01); *G09G 2320/0276* (2013.01); *G09G 2320/103* (2013.01); *G09G 2320/106* (2013.01); *G09G 2370/20* (2013.01)

(58) Field of Classification Search
CPC .... G06T 5/20; G06T 5/70; G06T 5/92; G06T 7/248; G06T 2207/20182; G06T 2207/20208; G06T 2207/20212; G09G 5/10; G09G 2320/0247; G09G 2320/0276; G09G 2320/103; G09G 2320/106; G09G 2370/20; H04N 17/00
USPC ................ 345/617; 382/118, 284; 375/7.193
See application file for complete search history.

(56) References Cited

U.S. PATENT DOCUMENTS

| | | | | |
|---|---|---|---|---|
| 2007/0248166 | A1* | 10/2007 | Chen ...................... | H04N 19/44 |
| | | | | 375/E7.193 |
| 2008/0089609 | A1* | 4/2008 | Perlmutter .............. | G06T 3/403 |
| | | | | 382/284 |
| 2012/0218442 | A1* | 8/2012 | Jandhyala ................. | G06T 5/50 |
| | | | | 348/E5.051 |
| 2013/0251283 | A1 | 9/2013 | Atanassov | |
| 2015/0178550 | A1* | 6/2015 | Hirashima ............. | G06V 10/60 |
| | | | | 382/118 |
| 2016/0366422 | A1 | 12/2016 | Yin | |
| 2017/0070719 | A1 | 3/2017 | Smolic | |
| 2017/0105042 | A1* | 4/2017 | Toma ................. | G11B 27/3027 |

(Continued)

*Primary Examiner* — Prabodh M Dharia
(74) *Attorney, Agent, or Firm* — Winston Hsu

(57) ABSTRACT

A processing method for a plurality of image sources, for a display device includes inputting a plurality of image sources; detecting the plurality of image sources according to metadata of the a plurality of image sources to determine electro-optical transfer function (EOTF) corresponding to the a plurality of image sources; and dynamically applying different EOTFs on corresponding image sources.

18 Claims, 4 Drawing Sheets

(56)                    References Cited

U.S. PATENT DOCUMENTS

| | | | | |
|---|---|---|---|---|
| 2017/0116963 A1* | 4/2017 | Wanat | .................. | G09G 3/3406 |
| 2018/0336669 A1* | 11/2018 | Mertens | ................. | H04N 5/445 |
| 2018/0352225 A1* | 12/2018 | Guo | .................... | H04N 19/186 |
| 2019/0180454 A1* | 6/2019 | Choudhury | .......... | H04N 19/139 |
| 2019/0304379 A1* | 10/2019 | Pytlarz | ................ | G09G 3/3406 |
| 2020/0252592 A1* | 8/2020 | Wang | ................. | H04N 25/6153 |
| 2021/0051344 A1* | 2/2021 | Talstra | ................ | H04N 19/172 |
| 2021/0195221 A1* | 6/2021 | Song | ................... | H04N 19/154 |
| 2021/0258555 A1* | 8/2021 | Leiby | .................. | H04N 13/279 |
| 2022/0180635 A1* | 6/2022 | Zandifar | ................. | H04N 7/01 |
| 2022/0295020 A1* | 9/2022 | Su | ....................... | H04N 19/154 |

* cited by examiner

METHOD OF PROCESSING MULTIPLE IMAGE SOURCES, RELATED DISPLAY DEVICE AND COMPUTER-READABLE MEDIUM

BACKGROUND OF THE INVENTION

1. Field of the Invention

The present invention relates to a method of processing multiple image sources, a related display device and a computer-readable medium, to a method of processing multiple image sources, a related display device and a computer-readable medium capable of dynamically applying different electro-optical transfer functions on multiple image sources.

2. Description of the Prior Art

High Dynamic Range (HDR) signal source may provide more detail and contrast of images, and is commonly utilized in conventional upper-intermediate, advanced displays. When a user activates a picture-in-picture (PiP) function and adjusts a resolution setting of the display, identical image settings are applied on different image sources of the PiP images with conventional technique, which cannot provide a good user experience. For example, since the conventional display can only apply the identical image settings on the PiP images, when a picture of the PiP images is a standard dynamic range (SDR) image source and another picture of the PiP images is HDR image source, abnormal SDR images might be generated when applying the settings of the HDR signal resources, and vice versa.

Therefore, improvements are necessary to the conventional technique.

SUMMARY OF THE INVENTION

In light of this, the present disclosure provides a method of processing multiple image sources, a related display device and a computer-readable medium, which dynamically applies different EOTFs on the image sources to optimize scenes of pictures on the display device.

An embodiment of the present disclosure discloses a processing method for a plurality of image sources, for a display device, comprises inputting said a plurality of image sources; detecting the said a plurality of image sources according to metadata of the said a plurality of image sources to determine electro-optical transfer function (EOTF) corresponding to the said a plurality of image sources; and dynamically applying different EOTFs on corresponding image sources Another embodiment of the present disclosure discloses a display device, comprises a display panel, configured to display a screen image; a plurality of input interfaces, configured to receive a plurality of image sources; and a scaler, configured for processing said a plurality of image sources, and detecting said a plurality of image sources according to metadata of said a plurality of image sources, so as to determine electro-optical transfer function (EOTF) corresponding to said a plurality of image sources; and dynamically applying different EOTFs on corresponding image sources.

Another embodiment of the present disclosure discloses a computer readable medium, comprises a computer program product, the computer program product is configured for executing a processing method for a plurality of image sources on a display device having a display panel, a plurality of input interfaces and a scaler, and the display panel is configured for displaying a screen image, the plurality of input interfaces are configured for receiving said a plurality of image sources, and the instructions executed by the scaler comprises processing said a plurality of image sources, detecting said a plurality of image sources according to metadata of said a plurality of image sources to determine electro-optical transfer function (EOTF) corresponding to said a plurality of image sources; and dynamically applying different EOTFs on corresponding image sources.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
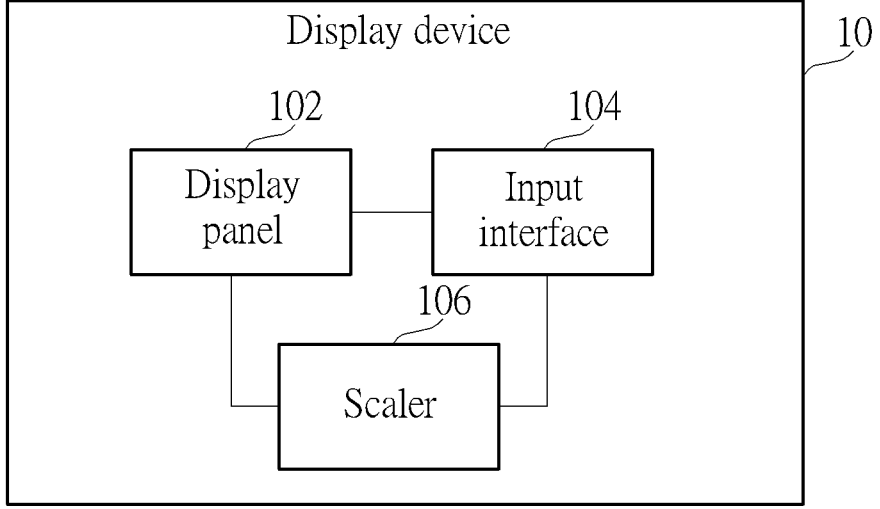
FIG. 1 is a schematic diagram of a display device according to an embodiment of the present disclosure.

Please refer to FIG. 1, which is a schematic diagram of a display device 10 according to an embodiment of the present disclosure. The display device 10 includes a display panel 102, a plurality of input interfaces 104 and a scaler 106. The display panel 102 is utilized for displaying a screen image, e.g. the display panel 102 may be a high dynamic range (HDR) display supporting a picture-in-picture (PiP) function or a picture-outside-picture (POP) function. The input interfaces 104 may be a high definition multimedia interface (HDMI) port, a display port (DP) or other input interfaces. The scaler 106 is utilized for processing multiple image sources, wherein the image sources may be the image sources from the HDMI port or the display port. In another embodiment, the image sources may be the screen image of a smart TV embedded in the display device.

The scaler 106 may detect the multiple image sources according to metadata of the multiple image sources to determine electro-optical transfer function (EOTF) corresponding to the multiple image sources, and to dynamically apply different EOTFs on corresponding image sources, wherein the metadata includes a Maximum Content Light Level (MaxCLL), a Maximum Frame Average Light Level (MaxFALL), and a Minimum Content Light Level (MinCLL) of the image source. Therefore, the display device 10 according to an embodiment of the present disclosure may present better screen images by applying optimal EOTF on the image sources.

Figure 2:
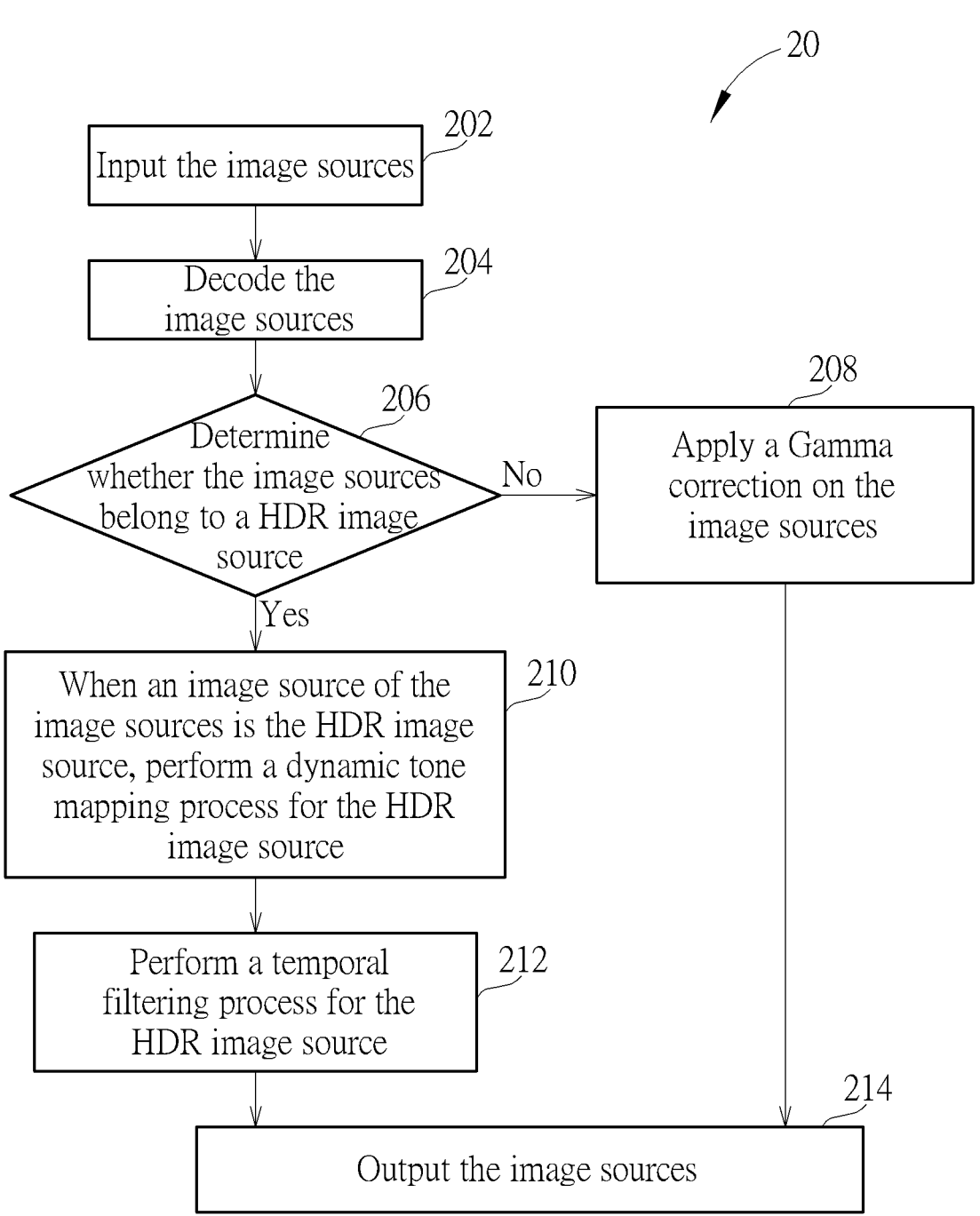
FIG. 2 is a schematic diagram of a processing method for multiple image sources according to an embodiment of the present disclosure.

In detail, please refer to FIG. 2, which is a schematic diagram of a processing method 20 for multiple image sources according to an embodiment of the present disclosure. The processing method 20 for multiple image sources may be executed by the scaler 106 of the display device 10. The processing method 20 for multiple image sources includes the following steps:

Step 202: Input the image sources;

Step 204: Decode the image sources;

Step 206: Determine whether the image sources belong to a HDR image source. If yes, proceed to Step 210; if no, proceed to Step 208;

Step 208: Apply a Gamma correction on the image sources;

Step 210: When an image source of the image sources is the HDR image source, perform a dynamic tone mapping process for the HDR image source;

Step 212: Perform a temporal filtering process for the HDR image source;

Step 214: Output the image sources.

Based on the processing method 20 for multiple image sources, the scaler 106 may perform decoding (i.e. step 204) for the image sources from different input interfaces or the smart TV embedded in the display device 10. In step 206, the scaler 106 may read the metadata of the image sources to determine whether the image sources belong to the HDR image source or not, if yes, a statistical analysis for the metadata of the HDR image source is performed to determine the EOTF of the HDR image source and the EOTF is applied on the HDR image sources.

In contrast, in step 210, when the scaler 106 determines that the image sources does not belong to the HDR image source according to the metadata of the image sources, the image sources may be determined as standard dynamic range (SDR) image sources. In this embodiment, the scaler 106 directly applies the Gamma correction on the SDR image resources.

In step 208, the scaler 106 may perform the dynamic tone mapping process for the HDR image sources to detect variations of each frame of the HDR image sources, and to dynamically adjust appropriate EOTF when the HDR image source is varied.

Figure 3:
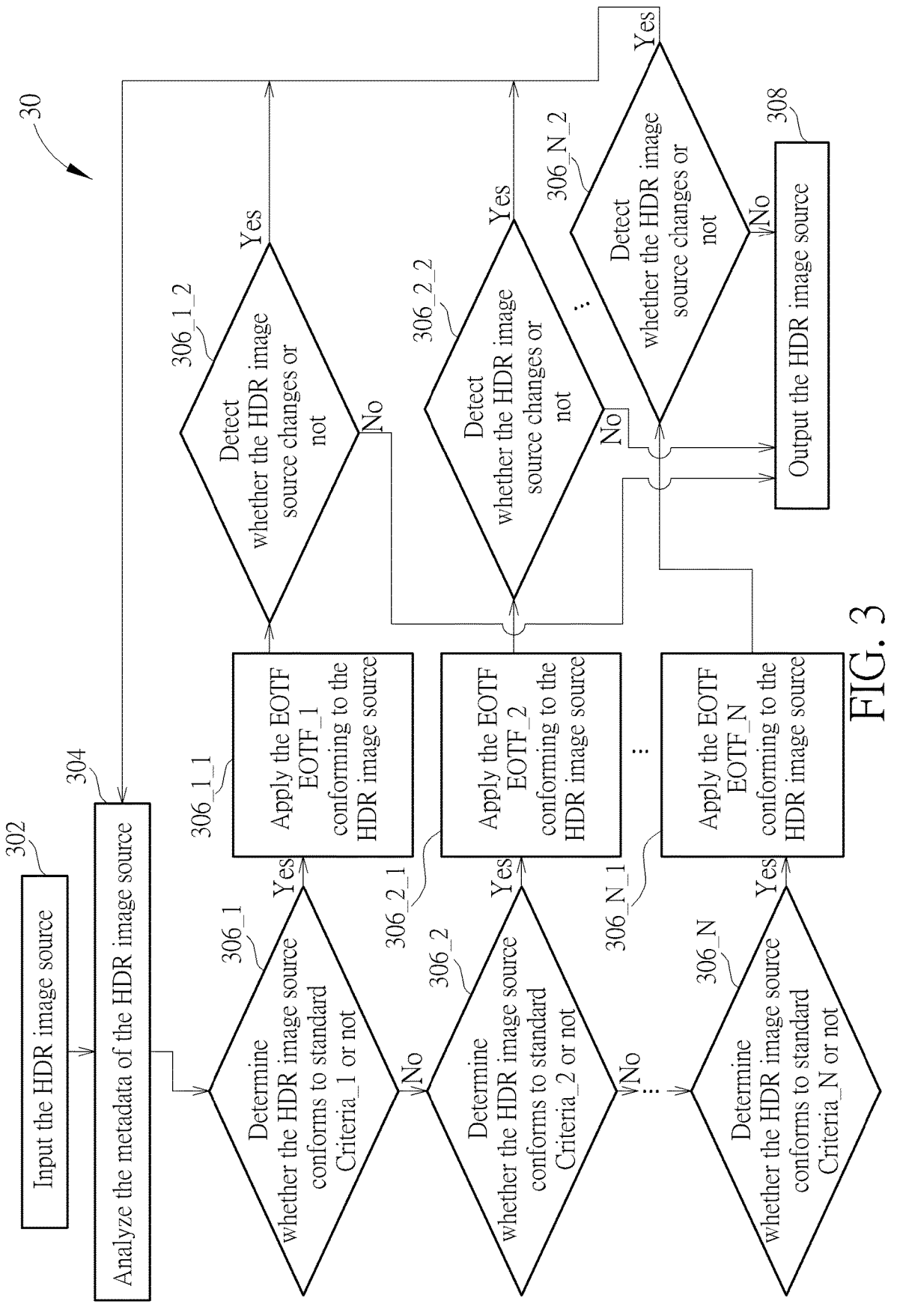
FIG. 3 is a schematic diagram of a dynamic tone mapping method according to an embodiment of the present disclosure.

The display device 10 according to an embodiment of the present disclosure may analyze the variations of each frame of the HDR image source, and apply optimal EOTF on the HDR image source according to a variation result of the image. Please refer to FIG. 3, which is a schematic diagram of a dynamic tone mapping method 30 according to an embodiment of the present disclosure. The dynamic tone mapping method 30 includes the following steps:

Step 302: Input the HDR image source;

Step 304: Analyze the metadata of the HDR image source;

Steps 306_1 to 306_N: Sequentially determine whether the HDR image source conforms to standards Criteria_1 to Criteria_n or not;

Steps 306_1_1 to 306_N_1: Apply the EOTFs EOTF_1 to EOTF_n conforming to the HDR image source;

Steps 306_1_2 to 306 N 2: Sequentially detect whether the HDR image source changes or not. If yes, proceed to step 304; if no, proceed to step 308;

Step 308: Output the HDR image source.

Based on the dynamic tone mapping method 30, the scaler 106 of the display device 10 according to an embodiment of the present disclosure may dynamically apply the default EOTFs EOTF_1 to EOTF_n on the HDR image source. For example, the scaler 106 in step 306_1 determines that the EOTF EOTF_1 is appropriate for current frame of the HDR image source, the EOTF EOTF 1 is applied thereon (step 306_1_1) . Then, when variation of the following frame of the HDR image source is detected (step 306_1_2), goes back to step 304 to look for other appropriate EOTF. In contrast, when no variation of the following frame of the HDR image source is detected by the scaler 106 (step 306_1_2), current HDR image source is outputted with identical EOTF in step 308

Therefore, the display device 10 according to an embodiment of the present disclosure may dynamically adjust the EOTF applied on the HDR image source.

Figure 4:
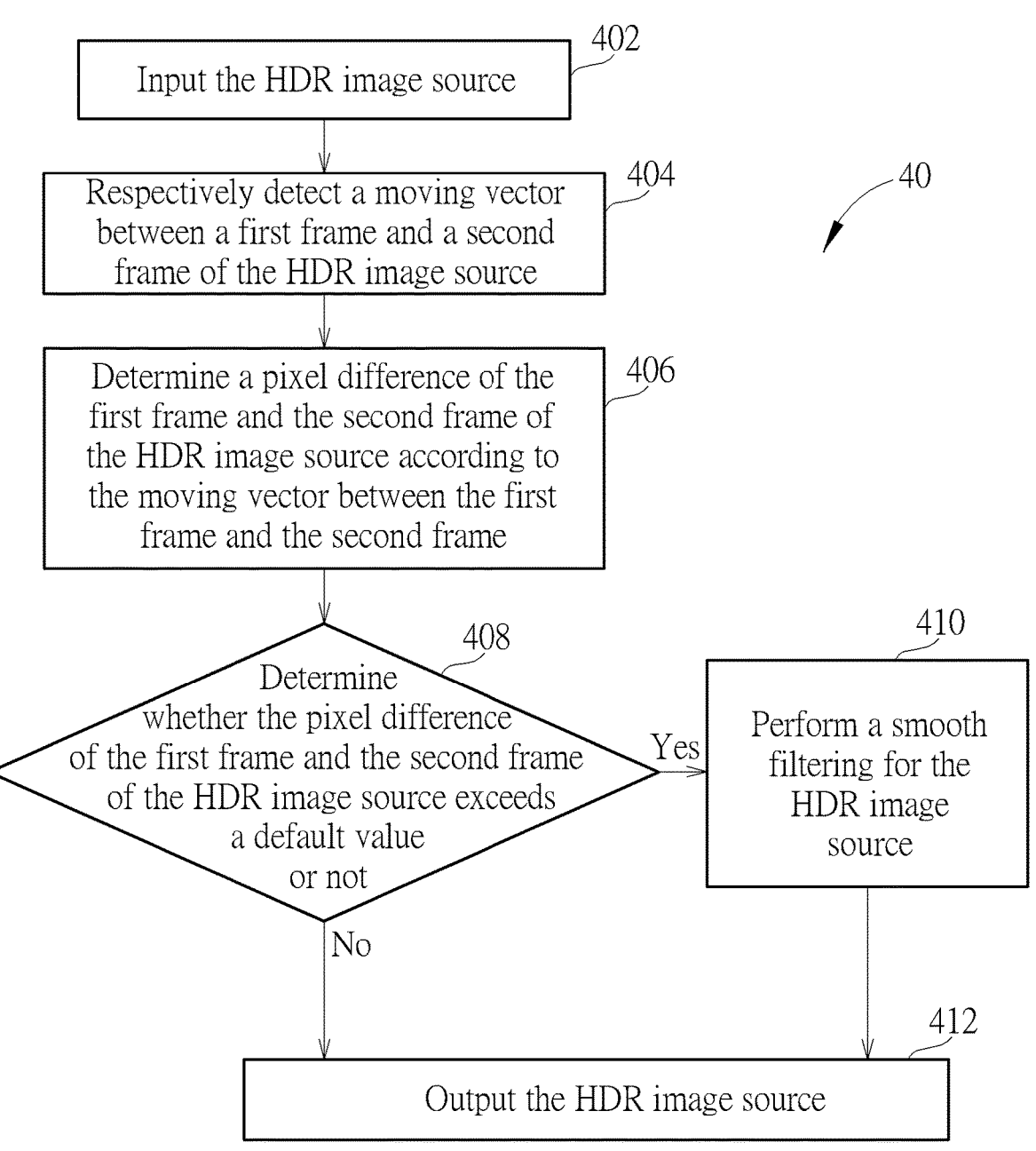
FIG. 4 is a schematic diagram of a temporal filtering method according to an embodiment of the present disclosure.

In order to avoid screen flickering caused by severe variation of the HDR image source, the display device 10 according to an embodiment of the present disclosure may further perform the temporal filtering for the HDR image source. Please refer to FIG. 4, which is a schematic diagram of a temporal filtering method 40 according to an embodiment of the present disclosure. The temporal filtering method 40 includes the following steps:

Step 402: Input the HDR image source;

Step 404: Respectively detect a moving vector between a first frame and a second frame of the HDR image source;

Step 406: Determine a pixel difference of the first frame and the second frame of the HDR image source according to the moving vector between the first frame and the second frame;

Step 408: Determine whether the pixel difference of the first frame and the second frame of the HDR image source exceeds a default value or not. If yes, proceed to Step 410; if no, proceed to Step 412;

Step 410: Perform a smooth filtering for the HDR image source;

Step 412: Output the HDR image source.

Based on the temporal filtering method 40, the display device 10 according to an embodiment of the present disclosure may respectively detect the moving vector between the first frame and the second frame of the HDR image source in step 404, determine the pixel difference of the first frame and the second frame of the HDR image source in step 406, and determine whether the pixel difference of the first frame and the second frame of the HDR image source exceeds a default value or not in step 408. As such, the scaler 106 of the display device 10 may determine whether the pixel difference of the first frame and the second frame of the HDR image source is larger than the default value or not accordingly to perform the smooth filtering in step 410. In contrast, when the pixel difference determined by the scaler 106 does not exceed the default value in step 408, the scaler 106 directly outputs the HDR image source in step 412.

Notably, the default value is related to a ratio of the pixel difference of each frame, e.g. when the pixel difference between the second frame and the first frame exceeds ⅓ of the first frame, the variation of the screen image of the HDR image source is too severe, and the smooth filtering is necessary to the HDR image source, wherein the smooth filtering is configured to perform image blending according to a similarity ratio of the current frame (i.e. the first frame) and the following frame (i.e. the second frame).

In contrast, when the pixel difference between the second frame and the first frame does not exceed ⅓ of the first frame, the original HDR image source is outputted. Therefore, the display device 10 according to an embodiment of the present disclosure may dynamically detect the inputted image sources to dynamically adjust the EOTF applied on the HDR image source to optimize the screen image.

Notably, the display device 10 according to an embodiment of the present disclosure may not only support the PiP function but also the POP function. In other words, when one of images of the PiP screen is sourced from high dynamic rage (HDR) content, the processing method 20 for multiple image sources as described in an embodiment of the present disclosure, may dynamically apply the EOTF on the HDR image source and apply the Gamma correction on the SDR image sources.

In another embodiment, when pictures of the PiP screen of the display device 10 are the HDR image sources, the processing method 20 for multiple image sources according to an embodiment of the present disclosure may apply the EOTF on the HDR image sources to optimize the screen image.

In another embodiment, a computer readable medium, e.g. a memory device of a processor or an external memory device operable by the processor, includes a computer program product for executing the processing method 20 for multiple image sources of the display device 10.

Notably, the content of the EOTF as described in the above embodiments, the default value for determining a variation of the screen are not limited thereto and can be modified according to different user requirements or system settings, which are all within the scope of the present disclosure.

In summary, the present disclosure provides a method of processing multiple image sources, a related display device and a computer-readable medium, which dynamically applies different EOTFs on the image sources to optimize scenes of pictures on the display device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A processing method a display device, comprising:
inputting a plurality of image sources of the display device;
detecting the plurality of image sources according to metadata of the plurality of image sources to determine whether each of the plurality of image sources is High Dynamic Range (HDR) image source or not;
when a first image source of the plurality of image sources is HDR image source, determining a first electro-optical transfer function (EOTF) corresponding to the first image source and applying the first EOTF on the first image source;
when a second image source of the plurality of image sources is HDR image source, determining a second EOTF corresponding to the second image source and applying the second EOTF on the second image source;
when the second image source of the plurality of image sources is not HDR image source, applying a Gamma correction on the second image source;
displaying images from the first image source and the second image source in a screen image of the display device, wherein the first EOTF is applied to the first image source, and the second EOTF or the Gamma correction is applied to the second image source;
detecting, respectively, a moving vector of a first frame and a second frame of the first image source;
determining a pixel difference between the first frame and the second frame of the first image source according to the moving vector of the first frame and the second frame; and
performing a smooth filtering for the first image source when the pixel difference between the first frame and the second frame of the first image source exceeds a default value;

wherein the smooth filtering for the first image source includes image blending according to a similarity ratio of the first frame and the second frame of the first image source.

2. The processing method according to claim 1, wherein the step of detecting the plurality of image sources according to metadata of the plurality of image sources to determine whether each of the plurality of image sources is High Dynamic Range (HDR) image source or not comprises:
reading metadata corresponding to each of the plurality of image sources; and
performing a statistical analysis for metadata corresponding to each of the plurality of image sources to determine whether the metadata corresponding to each of the plurality of image sources conforms to EOTF of the HDR image source or not.

3. The processing method according to claim 1, wherein the step of determining the first EOTF corresponding to the first image source and applying the first EOTF on the first image source comprises:
performing a dynamic tone mapping process for the first image source; and
performing a temporal filtering process for the first image source.

4. The processing method according to claim 1, wherein the step of displaying images from the first image source and the second image source in a screen image of the display device comprises:
displaying the images from the first image source and the second image source in a picture-in-picture (PiP) function or a picture-outside-picture (POP) screen.

5. A display device, comprising:
a display panel, configured to display a screen image;
a plurality of input interfaces, configured to receive a plurality of image sources; and
a scaler, configured for processing said a plurality of image sources, and detecting said a plurality of image sources according to metadata of said a plurality of image sources, so as to determine electro-optical transfer function (EOTF) corresponding to said a plurality of image sources; and dynamically applying different EOTFs on corresponding image sources;
wherein the scaler is configured for detecting a moving vector between a first frame and a second frame from one of said a plurality of image sources; and determining a pixel difference between the first frame and the second frame.

6. The display device according to claim 5, wherein the scaler is configured to perform a dynamic tone mapping process for an image source of said a plurality of image sources when the image source of said a plurality of image sources belong to the high dynamic range (HDR) image; and to perform a temporal filtering process for the image source of said a plurality of image sources.

7. The display device according to claim 5, wherein the scaler is configured for reading metadata corresponding to a HDR image source of said a plurality of image sources; performing a statistical analysis for the metadata corresponding to the HDR image source to determine EOTF of the HDR image source; and applying the EOTF to the HDR image source.

8. The display device according to claim 7, wherein the scaler is further configured for performing a smooth filtering for the HDR image source when the pixel difference between the first frame and the second frame of the HDR image source exceeds a default value.

9. The display device according to claim 5, wherein the scaler is configured to display images from said a plurality of image sources in the screen image.

10. The display device according to claim 5, wherein the scaler is configured for applying a Gamma correction to an image source of said a plurality of image sources conforming a standard dynamic range (SDR).

11. The display device according to claim 5, wherein the scaler is configured for determining whether each of said a plurality of image sources is High Dynamic Range (HDR) image source according to metadata of said a plurality of image sources.

12. A computer readable medium, comprising:

a computer program product, the computer program product is configured for executing a processing method for a plurality of image sources on a display device having a display panel, a plurality of input interfaces and a scaler, and the display panel is configured for displaying a screen image, the plurality of input interfaces are configured for receiving said a plurality of image sources, and the instructions executed by the scaler comprises:

processing said a plurality of image sources, detecting said a plurality of image sources according to metadata of said a plurality of image sources to determine electro-optical transfer function (EOTF) corresponding to said a plurality of image sources; and dynamically applying different EOTFs on corresponding image sources;

wherein the scaler is configured for detecting a moving vector between a first frame and a second frame from one of said a plurality of image sources; and determining a pixel difference between the first frame and the second frame.

13. The computer readable medium according to claim 12, wherein the scaler is configured for performing a dynamic tone mapping process for an image source of said a plurality of image sources when the image source of said a plurality of image sources belong to the high dynamic range (HDR) image; and performing a temporal filtering process for the image source of said a plurality of image sources.

14. The computer readable medium according to claim 12, wherein the scaler is configured for reading metadata corresponding to HDR image source of said a plurality of image sources; performing a statistical analysis for the metadata corresponding to the HDR image source to determine EOTF of the HDR image source; and applying the EOTF to the HDR image source.

15. The computer readable medium according to claim 14, wherein the scaler is further configured for performing a smooth filtering for the HDR image source when the pixel difference between the first frame and the second frame of the HDR image source exceeds a default value.

16. The computer readable medium according to claim 12, wherein the scaler is configured for displaying images from said a plurality of image sources in the screen image.

17. The computer readable medium according to claim 12, wherein the scaler is configured for applying a Gamma correction to an image source of said a plurality of image sources conforming a standard dynamic range (SDR).

18. The computer readable medium according to claim 12, wherein the scaler is configured for determining whether each of said a plurality of image sources is High Dynamic Range (HDR) image source according to metadata of said a plurality of image sources.

* * * * *